United States Patent
Park et al.

(10) Patent No.: US 8,035,908 B2
(45) Date of Patent: Oct. 11, 2011

(54) METHODS OF FORMING AND READING SERVO TRACK AND DATA STORAGE APPARATUS

(75) Inventors: Sang-Hyun Park, Seoul (KR); Kwang Jo Jung, Suwon-si (KR); Da Woon Chung, Suwon-si (KR); Yoon Chul Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 147 days.

(21) Appl. No.: 12/535,898

(22) Filed: Aug. 5, 2009

(65) Prior Publication Data

US 2010/0033864 A1     Feb. 11, 2010

(30) Foreign Application Priority Data

Aug. 5, 2008 (KR) ......................... 10-2008-0076431

(51) Int. Cl.
*G11B 5/86* (2006.01)
*G11B 5/596* (2006.01)
(52) U.S. Cl. ............. 360/17; 360/13; 360/48; 360/77.08
(58) Field of Classification Search .................. None
See application file for complete search history.

(56) References Cited

U.S. PATENT DOCUMENTS

| 7,164,548 | B2 * | 1/2007 | Hattori et al. ................. 360/48 |
| 7,385,774 | B2 * | 6/2008 | Nishikawa et al. .............. 360/17 |
| 7,561,360 | B2 * | 7/2009 | Kamimura et al. ............. 360/48 |
| 7,885,026 | B2 * | 2/2011 | Lee et al. ....................... 360/48 |

FOREIGN PATENT DOCUMENTS

| JP | 11110703 A | 4/1999 |
| JP | 11144204 A | 5/1999 |
| JP | 11175966 A | 7/1999 |
| JP | 2005209274 A | 8/2005 |

\* cited by examiner

*Primary Examiner* — Jason Olson
(74) *Attorney, Agent, or Firm* — Volentine & Whitt, PLLC

(57) ABSTRACT

A method of forming a servo track on a recording medium includes; forming a magnetic layer, defining a first servo track region having a plurality of first magnetic segments and a second servo track region having a second plurality of magnetic segments in the magnetic layer, applying a first magnetic field to induce a first magnetization direction in the first and second pluralities of magnetic segments, forming first magnetic patterns, each having a first width, and second magnetic patterns, each having a second width different from the first width, on a first side of a substrate, disposing the substrate on the recording medium, such that the first magnetic patterns are aligned in correspondence with the plurality of first magnetic segments and the second magnetic patterns are aligned in correspondence with the plurality of second magnetic segments, and applying a second magnetic field to the recording medium to selectively induce a second magnetization direction into first selected ones of the first plurality of magnetic segments and second selected ones of the second plurality of magnetic segments.

19 Claims, 8 Drawing Sheets

METHODS OF FORMING AND READING SERVO TRACK AND DATA STORAGE APPARATUS

PRIORITY STATEMENT

This application claims priority under 35 U.S.C. §119 to Korean Patent Application No. 10-2008-0076431 filed on Aug. 5, 2008, the subject matter of which is hereby incorporated by reference.

BACKGROUND

The present invention relates to a data storage apparatus. More particularly, the invention relates to methods of forming servo tracks on storage apparatus media, and a data storage apparatus having servo tracks formed using said method.

A hard disk drive (HDD) is an apparatus for writing data to or reading data from a rotating, disk-type magnetic recording medium using a read/write head located above the recording medium. In order to manufacture a HDD with a high recording density, the dense formation of the servo tracks on the recording medium is essential. Conventional servo writing technology was limited for some time to the formation of servo tracks on a HDD having a density of about 300 kTPI.

More recently, a method of forming servo tracks on a HDD using magnetic printing techniques has been introduced. Magnetic printing is a method of applying a magnetic material to the surface of a magnetic disk including servo tracks. The constituent data storage apparatus is thus enabled to store data according to a defined magnetization direction. While magnetic printing has allowed improved servo track densities, it nonetheless suffers from certain noise issues. For example, noise may occur in a non-signal field portion (e.g., a buffer field) of a servo track. This type of noise may lead to the generation of a direct current (DC) offset in a reproduced data signal. Undesired DC offsets deteriorate the quality of the reproduced data signal and may in certain circumstances cause malfunction of the data storage apparatus.

SUMMARY

Embodiments of the invention provide methods of forming servo tracks on recording media of a data storage apparatus that preclude or inhibit the generation of direct current (DC) noise. Embodiments of the invention also provide a data storage apparatus and system manufactured incorporating such servo tracks formed by said methods.

In one embodiment, the invention provides a method of forming a servo track on a recording medium of a data storage apparatus, the method comprising; forming a magnetic layer on a first side of the recording medium, defining a first servo track region having a plurality of first magnetic segments and a second servo track region having a second plurality of magnetic segments in the magnetic layer, applying a first magnetic field to the recording medium to induce a first magnetization direction in the first and second pluralities of magnetic segments, forming first magnetic patterns, each having a first width, and second magnetic patterns, each having a second width different from the first width, on a first side of a substrate, disposing the first side of the substrate on the first side of the recording medium, such that the first magnetic patterns are aligned in correspondence with the plurality of first magnetic segments and the second magnetic patterns are aligned in correspondence with the plurality of second magnetic segments, and applying a second magnetic field to the recording medium to selectively induce a second magnetization direction into first selected ones of the first plurality of magnetic segments and second selected ones of the second plurality of magnetic segments.

In another embodiment, the invention provides a method of reading servo data from a servo track formed on a recording medium of a data storage apparatus, the method comprising; detecting a first read signal having a first frequency from a first servo track region, and detecting a second read signal having a second frequency different from the first frequency from a second servo track region, and filtering the first read signal from the second read frequency in relation to the different first and second frequencies. The first and second frequencies of the first and second read signals are defined by forming an arrangement of first magnetic segments having a first width in the first servo track region and an arrangement of second magnetic segments having a second width different from the first width in the second servo track region, and inducing first and second magnetization directions in selected one of the first magnetic segments and the second magnetic segments.

In another embodiment, the invention provides a data storage apparatus comprising; a data storage unit comprising recording medium having a magnetic layer formed thereon, the magnetic layer comprising; a first servo track region having an arrangement of first magnetic segments, and a second servo track region having an arrangement of second magnetic segments, a read head configured to detect a first read signal from the first servo track region and a second read signal from the second servo track region, a filter configured to filter the first and second read signals, and a controller configured to control overall operation of the data storage unit, and the read head. The first and second frequencies of the first and second read signals are defined by forming the arrangement of first magnetic segments with a first width in the first servo track region and the arrangement of second magnetic segments with a second width different from the first width in the second servo track region, and inducing first and second magnetization directions in selected one of the first magnetic segments and the second magnetic segments.

BRIEF DESCRIPTION OF THE DRAWINGS

The above and other features and advantages of the present invention will become more apparent by describing in detail exemplary embodiments thereof with reference to the attached drawings in which.

DESCRIPTION OF EMBODIMENTS

The present invention now will be described in some additional detail with reference to the accompanying drawings. This invention may, however, be embodied in many different forms and should not be construed as being limited to only the illustrated embodiments. Rather, these embodiments are presented as teaching examples.

In the drawings, the size and relative sizes of certain layers and regions may be exaggerated for clarity. Throughout the written description and drawings, like reference numbers refer to like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
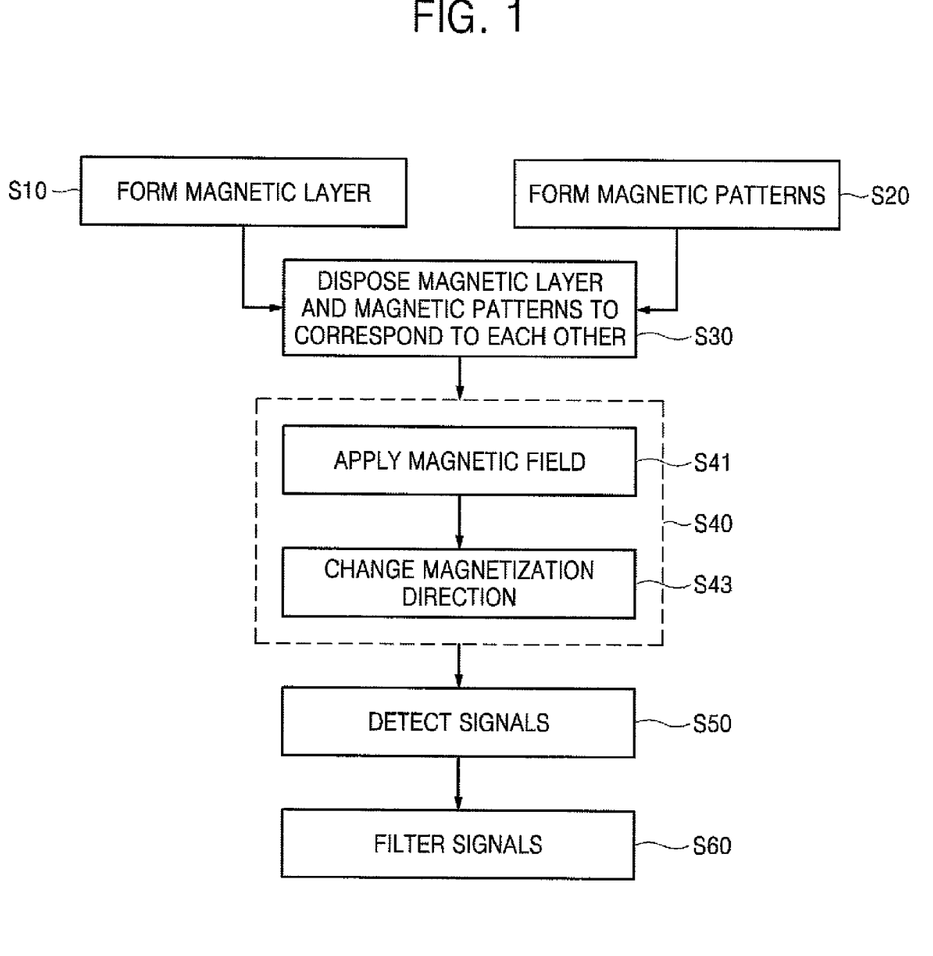
FIG. 1 is a flowchart summarizing a method of forming a servo track according to an embodiment of the invention.

FIG. 1 is a flowchart summarizing a method of forming a servo track according to embodiments of the present invention. FIGS. 2 through 6 are conceptual diagrams further illustrating certain stages in the method of FIG. 1.

In one embodiment, a data storage apparatus according to the present invention is assumed to include a single magnetic disk having defined thereon at least one data area and a servo track area. Other embodiments of the invention may include multiple disks written to and read from by one or more read/write heads.

Each data area on the disk is able to receive and store externally provided "write data" and thereafter return identified "read data." Write data and read data may be termed "payload data" as they contain information relevant to a host device data request or application running on an associated host device. In contrast, the servo track area stores "servo data" or information characterizing one or more data area, (e.g., preamble information, address information, sector information, track information, and/or burst information). In certain embodiments, a servo track area may include one or more first servo track region(s) serving as buffer region(s), and a second servo track region storing the servo data. The one or more first servo track region(s) may be formed before and/or after a corresponding second servo track region.

Figure 2:
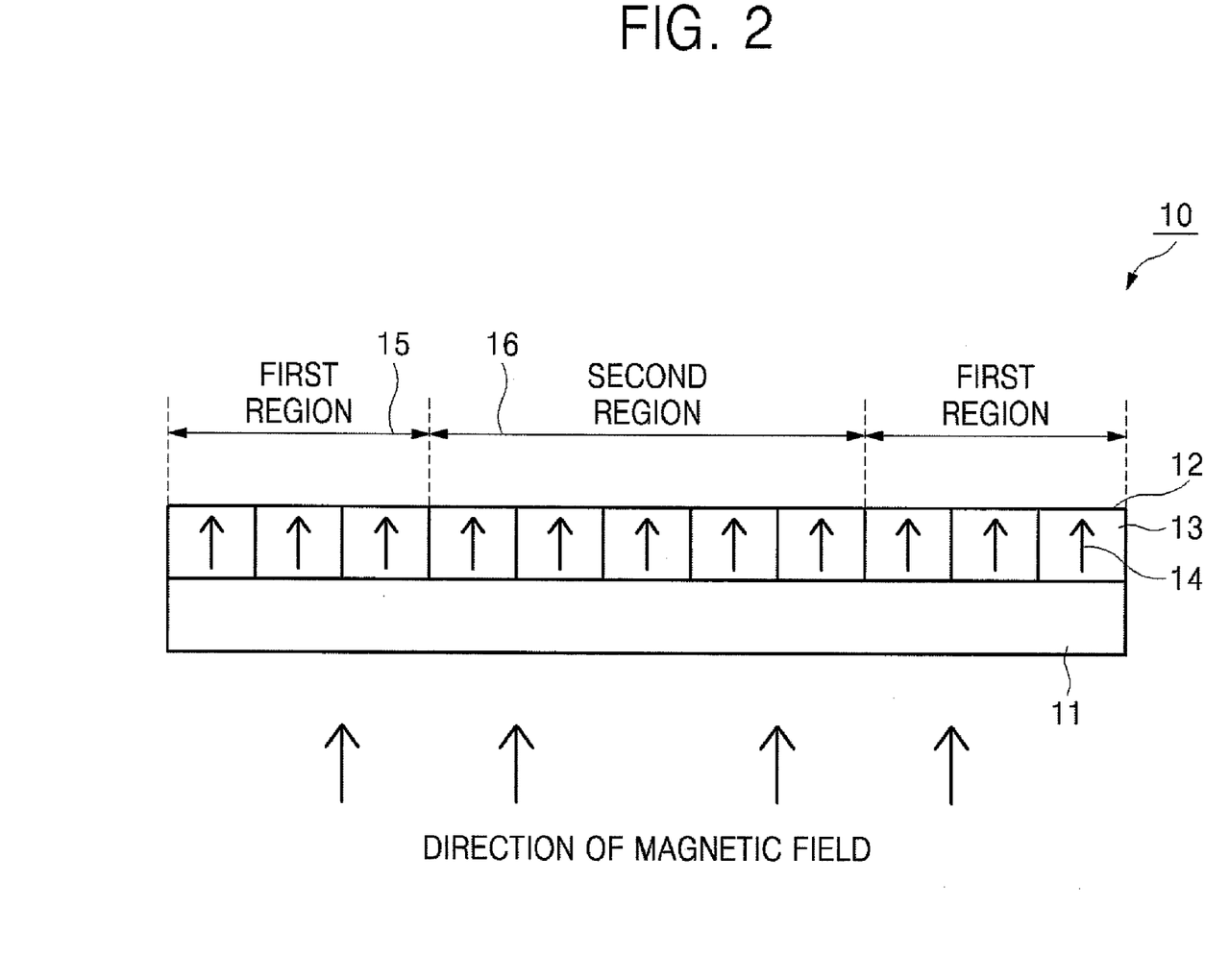
FIGS. 2 through 6 are conceptual diagrams further illustrating certain stages in the method summarized in FIG. 1.

Referring to FIGS. 1 and 2, in the illustrated method of forming the servo track, a magnetic layer 12 may be formed on a disk 11 of a data storage apparatus 10 (S10). A servo track area within the data storage apparatus 10 includes dual (left/right) first servo track regions 15 and bracketing a corresponding second servo track region 16. Each first servo track region 15 is assumed to be a no-signal field serving as a buffer region in relation to the second servo track region 16. In contrast, the second servo track region 16 is used to store servo data and/or certain payload data.

The magnetic layer 12 is formed to a predetermined thickness on one side of the disk 11. That is, the servo track area including the first servo track region(s) 15 and the second servo track region 16 are disposed on a single side of the disk 11. The magnetic layer 12 may be formed on this one side of the disk 11 by selectively applying to a magnetic material a magnetization direction induced by an externally applied magnetic field.

This magnetic material may have been applied using a printing method, but embodiments of the invention are not limited to only magnetic material layers formed using a printing method. The magnetic layer 12 is divided into a plurality of magnetic segments 13 and a predetermined "first" magnetization direction may be formed in each portion of the magnetic layer 12 containing each one of the plurality of magnetic segments 13. In the illustrated example, three magnetic segments 13 are formed in each first servo track region 15. However, those skilled in the art will recognize that the specific number of magnetic segments used is a matter of design choice. Because each one of the magnetic segments 13 is magnetized in the first magnetization direction 14, a uniform magnetic field may be applied to the disk 11.

The magnetization direction assigned to each magnetic segment 13 of magnetic layer 12 is determined by the direction (or polarity) of the applied magnetic field. For instance, a magnetic field may be applied to a bottom side of the disk 11, (i.e., a side opposite the side having the magnetic layer 12 formed thereon), in a direction perpendicular to the principal planar surface of the magnetic layer 12. Alternately, a magnetic field may be applied to the front side of the disk 11 in a direction perpendicular to principal planar surface of the magnetic layer 12. This alternate application of the magnetic field would, in the nomenclature of the illustrated embodiment, result in a magnetization of the plurality of magnetic segments 13 in a second magnetization direction opposite to that of the first magnetization direction 14.

Figure 3:
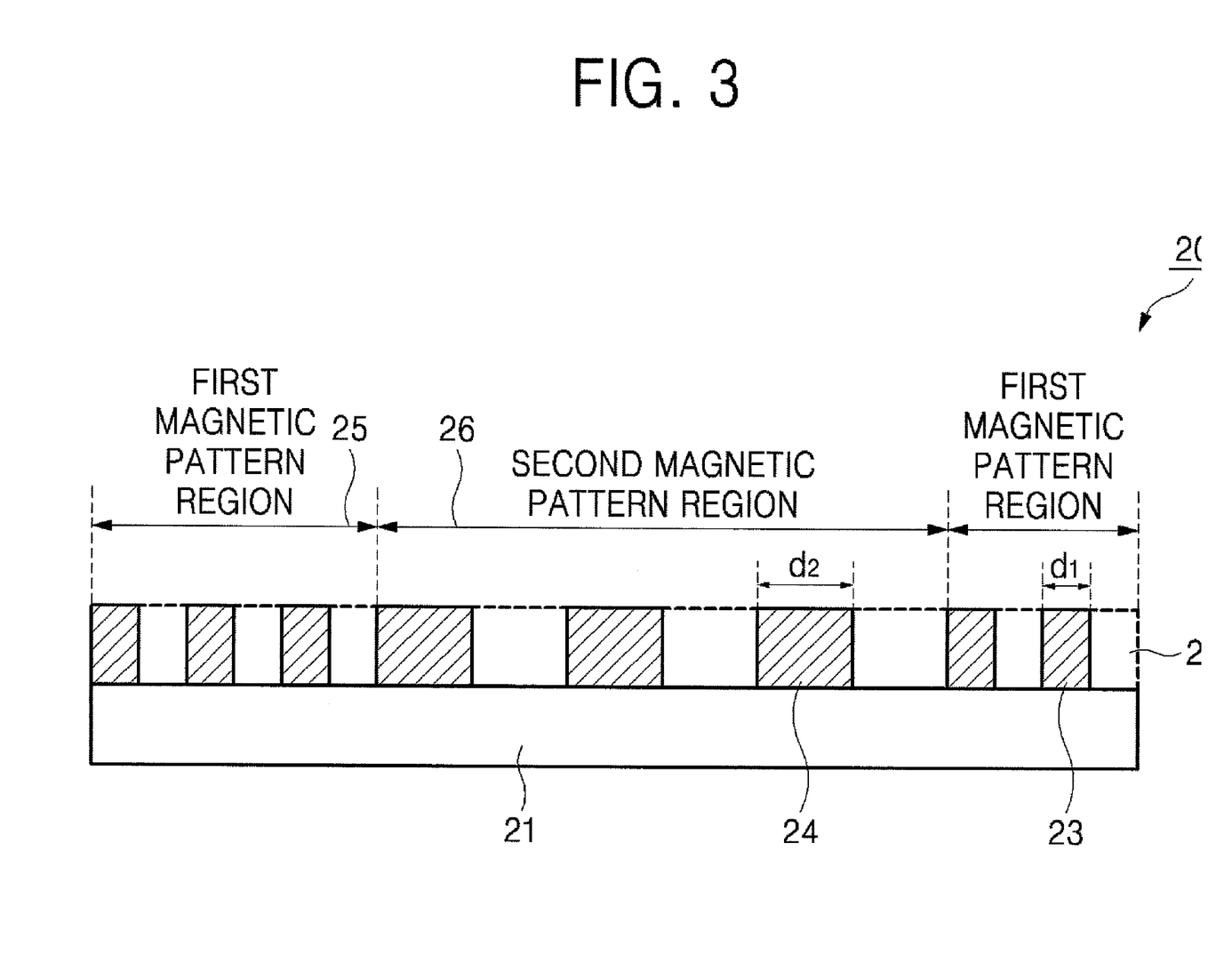

Referring to FIGS. 1 and 3, according to another method of forming a servo track on a magnetic disk, first and second magnetic patterns 23 and 24 are formed on a substrate 21 (S20). In this stage, a writing apparatus 20 is used to write predetermined information to the magnetic layer 12 on the disk 11 of the data storage apparatus 10, as described above. The first and second magnetic patterns 23 and 24 correspond to the first and second arrangements of the magnetic segments 13 on the disk 11 in the respective first and second servo track regions. The first and second magnetic patterns 23 and 24 may be separately formed on the substrate 21 which may be implemented using a semiconductor substrate.

The substrate 21 includes a first magnetic pattern region 25 and a second magnetic pattern region 26. The first magnetic pattern region 25 corresponds to the first servo track region(s) 15, and the second magnetic pattern region 26 corresponds to the second servo track region 16.

A magnetic material 22 is applied to a predetermined thickness on one side of the substrate 21 including the first magnetic pattern region 25 and the second magnetic pattern region 26. The magnetic material 22 may be formed from a material capable of effectively communicating an externally applied magnetic field, and may be applied using conventionally understood spin coating or print coating techniques.

The magnetic material 22 formed on the substrate 21 is selectively patterned. In the illustrated embodiment, the magnetic material 22 is patterned such that the first magnetic pattern 25 is formed by alternating pattern regions 23 having a first width d1, and the second magnetic pattern 26 is formed by alternating pattern regions 24 having a second width d2. The first width d1 of the first magnetic pattern 25 is smaller than the second width d2 of the second magnetic pattern 26. In one embodiment of the invention, the first width d1 is 1/N, where N is an integer greater than 0, of the second width d2. The first and second patterns regions 23 and 24 may be defined using photolithography or wet/dry etching using a mask on the magnetic material 22, for example.

Figure 4:
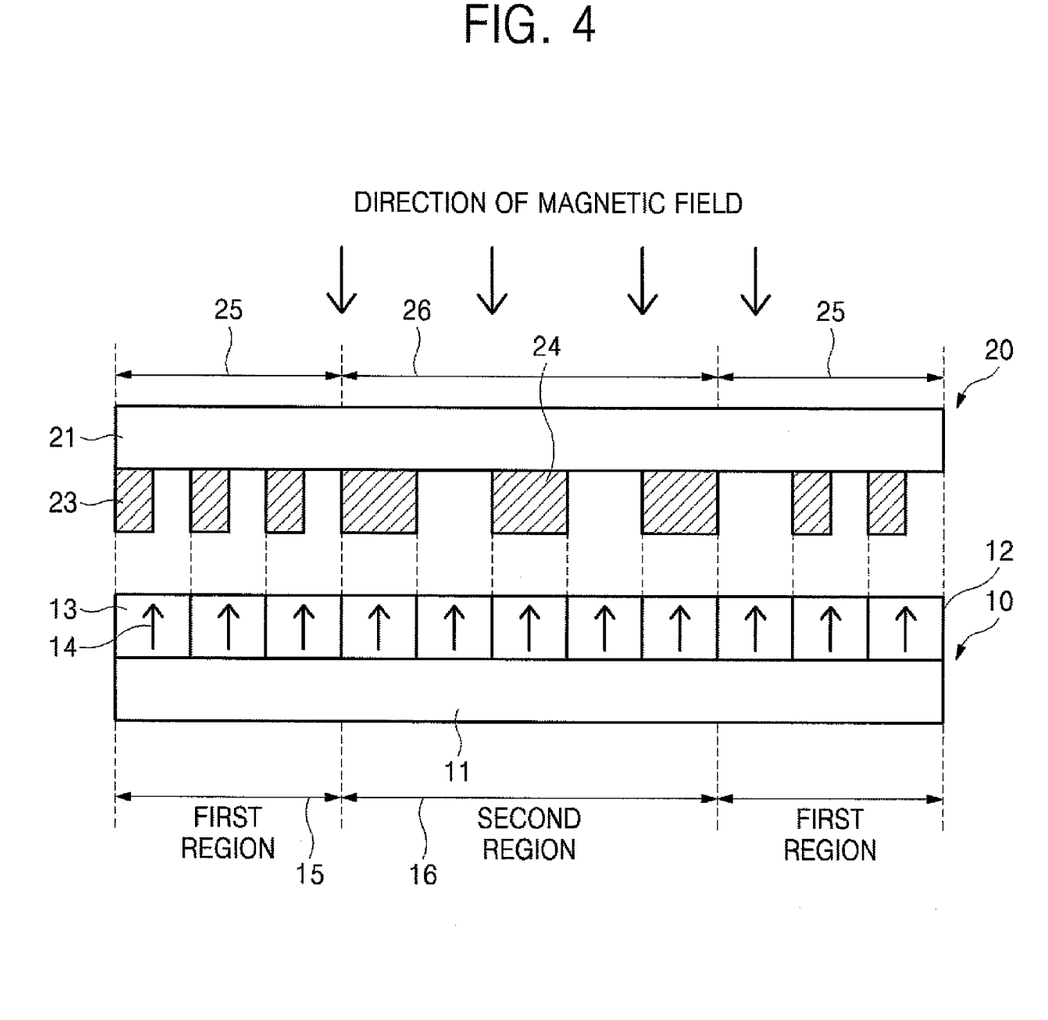

Referring to FIGS. 1 and 4, the substrate 21 containing the first and second magnetic patterns 25 and 26 is disposed over the disk 11 (S30). In the illustrated embodiment of FIG. 4, the first surface of the disk 11 including the plurality of magnetic segments 13 faces the working surface of the substrate 21 including the first and second magnetic patterns 25 and 26, such that each one of the magnetic segments 13 is vertically under a corresponding first pattern 23 in the first servo track regions 15, or a corresponding second pattern 24 in the second servo track region 16.

Figure 5:
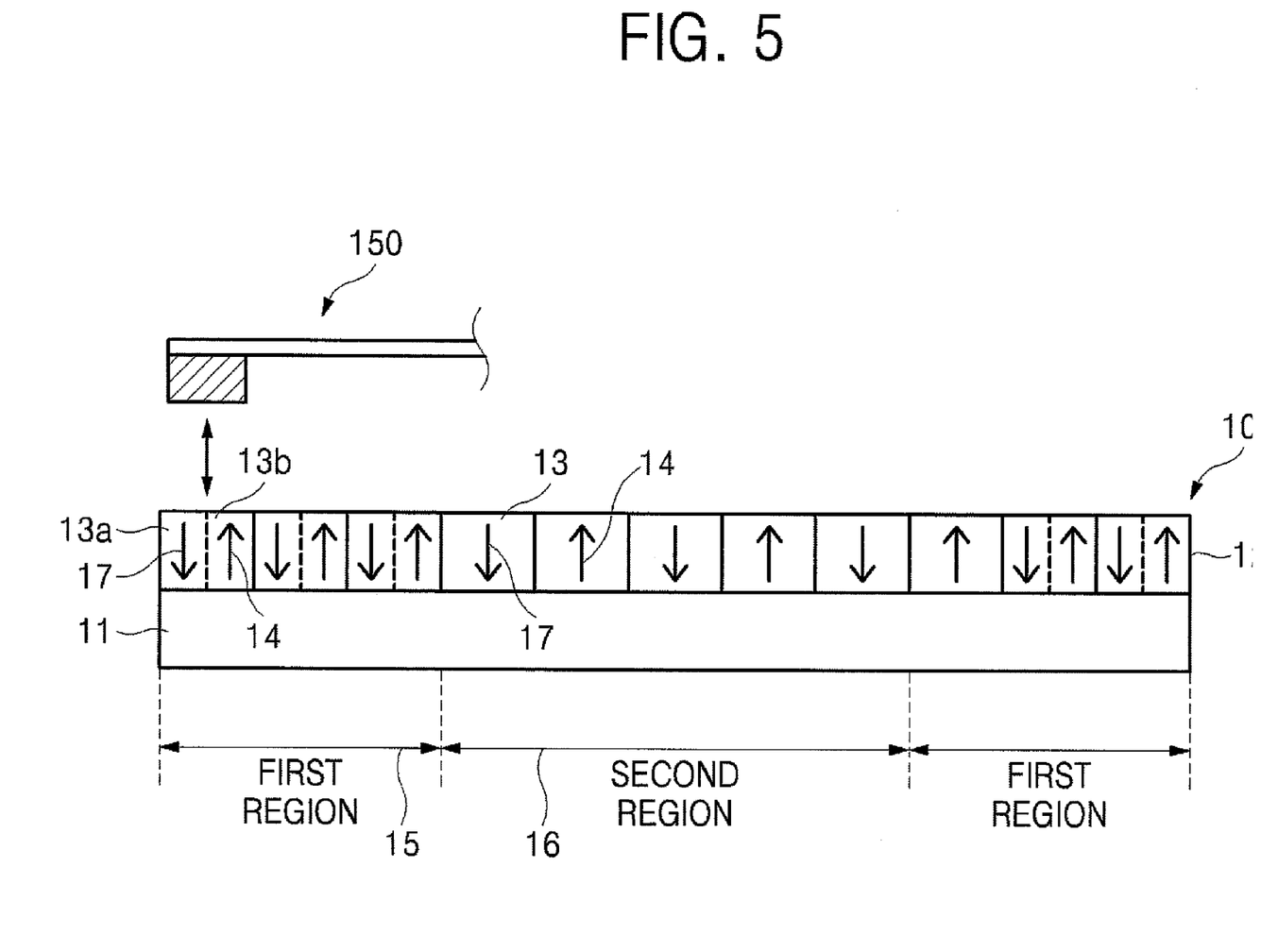

Referring to FIGS. 1, 4 and 5, a second magnetic field is now vertically applied to the upward facing bottom surface of the substrate 21 (S41) in order to change the magnetization direction of certain magnetic segments 13 (in the second servo track region 16) or magnetic segment portions (in the first servo track regions(s) 15) within the magnetic layer 12 (S43). Operations S41 and S43 actually happen in a single operation (S40). Thus, assuming that the working (first) surfaces of the disk 11 and substrate 21 are disposed facing one another, the second magnetic field is applied "through" the upward facing bottom surface (i.e., in a direction from the bottom surface to top surface) of the substrate 21.

Since the applied second magnetic field is effectively conducted (i.e., communicated) to the magnetic layer 12 of the disk 11 via the first and second patterns 23 and 24 and is not effectively conducted by the intervening gaps (i.e., the regions of the substrate working surface between adjacent patterns), only selected ones (or selected portions) of the plurality of magnetic segments 13 have their magnetization direction changed. In the illustrated embodiment, the applied second magnetic field is vertically applied through the substrate 21 in a direction substantially opposite to that of the first magnetization direction 14, or in effect yielding a second magnetization direction 17. However, other relative magnetization directions (non-vertical with respect to a substantially horizontal magnetic layer 12) may be defined by the applied first and second magnetic fields.

Thus, in the illustrated embodiment of FIG. 5, each one of the magnetic segments 13 disposed in a first servo track region 15 includes a first segment region 13b having the first magnetization direction 14 and a second segment region 13a having the second magnetization direction 17. Here, each one of the first and second segment regions has the first width d1 approximately equal to about half of the original magnetic segment region width d2, but other geometries may be used by other embodiments of the invention. In contrast, the magnetic segments 13 disposed in the second servo track region 16 are alternately polarized between the first and second magnetization directions 14 and 17.

Figure 6:
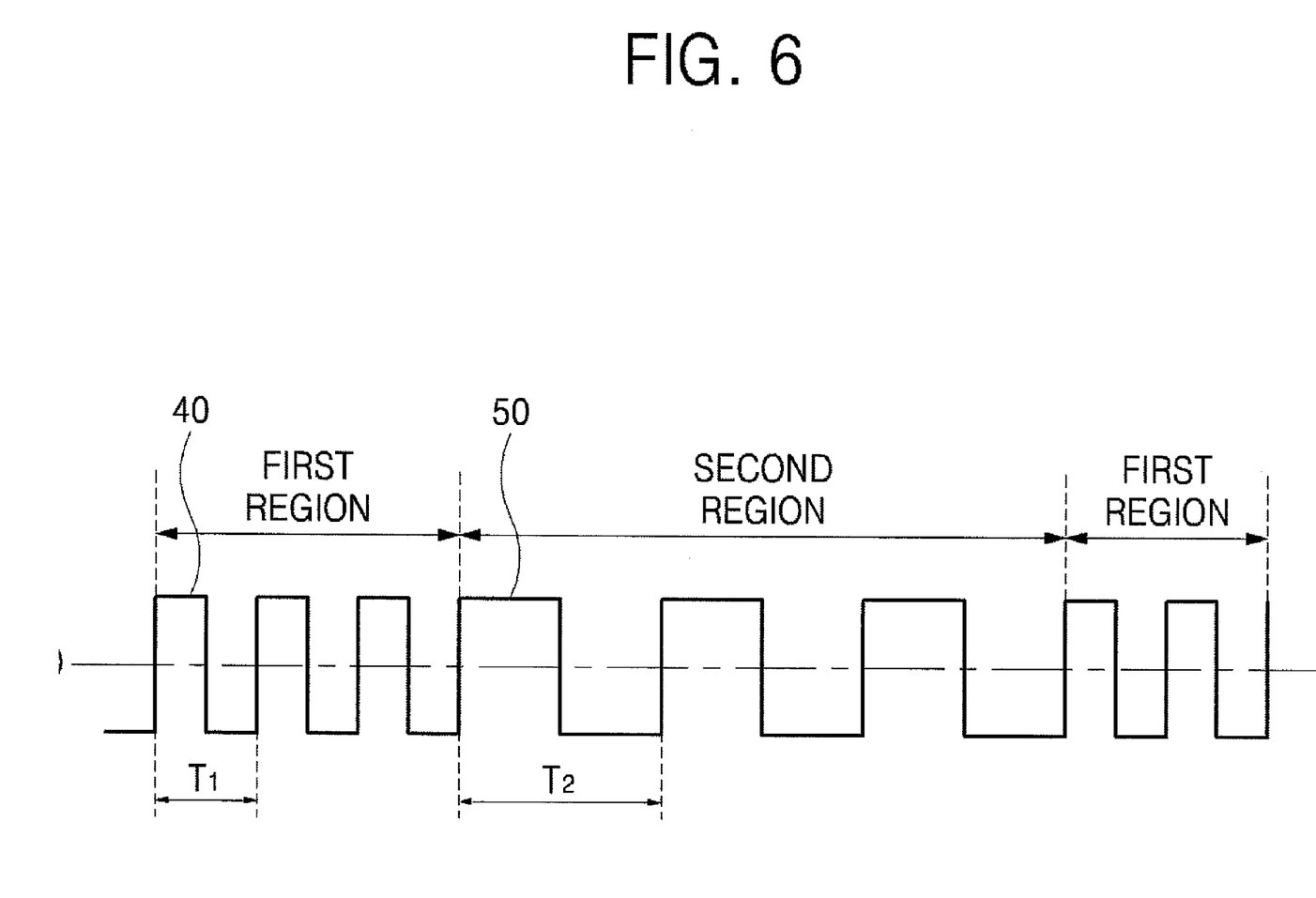

Referring to FIGS. 1, 5, and 6, read signals may be detected from the magnetic layer 12 of the disk 11 using a read head 150 (S50). The resulting read signals may be filtered (S60) prior to use by external circuitry.

That is, a first read signal 40 may be detected using the read head 150 placed near magnetic segments 13 of the first servo track region 15. A second read signal 50 may be detected using the read head 150 placed near magnetic segments 13 of the second servo track region 16. The first and second read signals 40 and 50 will exhibit different cycles or read frequencies in relation to the different spacing between the alternately polarized magnetic segments 13 in each region. For instance, the first read signal 40 detected in the first servo track region 15 will have a first cycle period T1 defined by high/low signal transitions associated with the first magnetization direction 14 and the second magnetization direction 17. The second read signal 50 detected in the second servo track region 16 will have a second cycle period T2 similarly defined by high/low signal transitions.

In other words, the first read signal 40 detected in the first servo track region 15 will have a higher frequency (or a shorter cycle period) than the second signal 50 detected in the second servo track region 16. For example, the first cycle period T1 for the first signal 40 may be 1/M, where M is an integer greater than 0, of the second cycle period T2 for the second signal 50.

As noted above, the first servo track region 15 may be used as a no-signal field of a buffer field and the second servo track region 16 may be used to store servo data. Like all magnetic recording media, it is possible that noise may affect the first read signal 40 detected in the first servo track region 15. However, since such noise will be associated with the first read signal 40, and the first read signal has a different frequency than the second read signal containing the desired servo data, the noisy first read signal associated with a first servo track region 15 may be readily filtered out. A conventional high/low filter, band pass filter, or band reject filter may be used to effectively separate the second read signal containing servo data from the first read signal.

Figure 7:
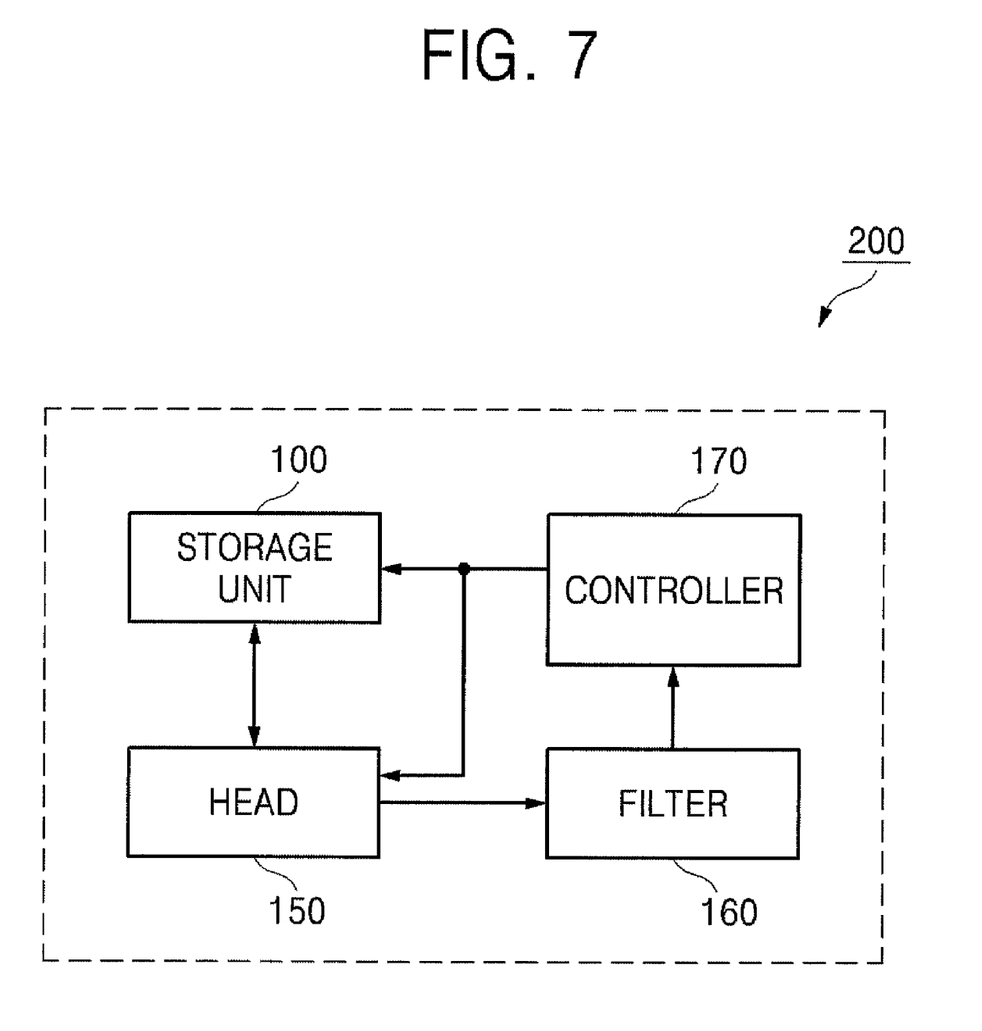
FIG. 7 is a general block diagram of a data storage apparatus manufactured according to the method of FIGS. 1 through 6.

FIG. 7 is a general block diagram of a data storage apparatus 200 manufactured in accordance with a method of forming a servo track as described above. FIGS. 1 through 6 will be referred to as well as FIG. 7 in describing the data storage apparatus 200. The data storage apparatus 200 may be implemented using a hard disk drive (HDD) capable of electronically or magnetically storing data. Such drives are usually cheaper on a per-stored-data-bit basis than non-volatile memory devices, such as solid state drives (SSD) having similar storage capacity.

Referring to FIG. 7, the data storage apparatus 200 includes a storage unit 100, the read head 150, a controller 170, and a filter 160. The storage unit 100 includes recording media having at least one servo track as described with reference to FIGS. 1 through 6. For instance, the storage unit 100 may be implemented with at least one disk 11. The disk 11 includes a data storage area and a servo track area. As described above, in the servo track area of the disk 11 is formed with magnetic layer 12 including the plurality of magnetic segments 13 each having either the first magnetization direction 14 and/or the second magnetization direction 17.

As described with reference to FIG. 5, the head 150 detects a read signal when proximate to the magnetic layer 12. The controller 170 controls the overall operation of the read head 150 and storage unit 100, as is conventionally understood. For instance, the controller 170 will control the rotation of the disk 11 at a predetermined velocity and the movement of the read head 150 across the disk 11 in order to detect data signals from the disk 11.

The filter 160 is used to filter the signals detected by the read head 150 and may thereafter provide filtered signals to the controller 170. As described above with reference to FIGS. 1 and 6, the filter 160 may be used to eliminate a noisy first read signal 40 from a desired second read signal 50.

Figure 8:
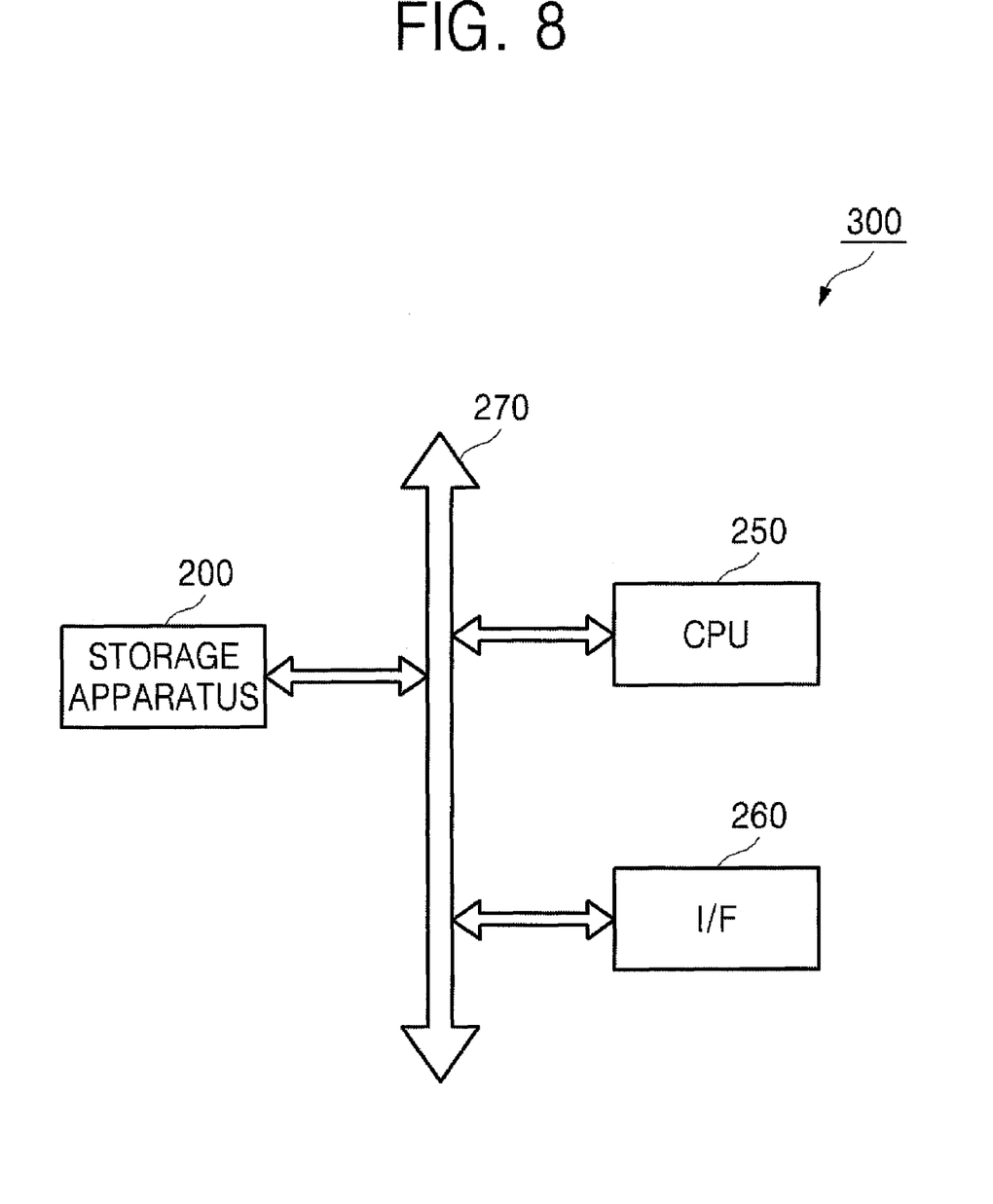
FIG. 8 is a general block diagram of a data storage system including the data storage apparatus of FIG. 7.

FIG. 8 is a general block diagram of a data storage system 300 including the data storage apparatus 200 illustrated in FIG. 7. The data storage system 300 may be a computer system, a terminal system, or an input/output system. In addition, the data storage system 300 may be any type of consumer equipment (CE) including the data storage apparatus 200 according to some embodiments of the present invention. The CE may be an HDD recorder, a personal terminal (e.g., a cellular phone or a personal digital assistant (PDA)), a computer (e.g., a personal computer (PC), a laptop computer, or a notebook computer), a navigator device, a home automation system, a music player (e.g., an MP3 player), a camcorder, a video player (e.g., a DivX player), a storage server, or a portable multimedia player (PMP). For clarity of the description, it is assumed that the data storage system 300 is a computer system.

Referring to FIG. 8, the data storage system 300 includes a bus 270, a central processing unit (CPU) 250, the data storage apparatus 200, and an interface (I/F) 260. Although not shown, the data storage system 300 may also include a battery so that the data storage system 300 is portable.

The CPU 250 generates control signal(s) controlling the overall operation of the data storage apparatus 200 and provides the control signal to the data storage apparatus 200 via the bus 270. As described with reference to FIG. 7 above, the data storage apparatus 200 may include the storage unit 100, read head 150, filter 160, and controller 170 and may store externally input data therein or transmit stored data outside according to the control signal provided from the CPU 250. The I/F 260 may be an input/output (I/O) I/F or a wireless I/F and functions as a passage through which the CPU 250 or the data storage apparatus 200 can access the outside.

According to certain embodiments of the invention, a noisy read signal arising from a first servo track region (i.e., a buffer region) may be effectively removed by causing the first read signal to have a different frequency than a desired second read signal arising from a second servo track region. This difference in respective read signal frequency may be induced by differently sized alternating magnetic segment regions for the first and second servo track regions. More effective removal of the noisy first read signal arising from a servo track buffer region will reduce the likelihood of malfunction in a data storage apparatus, and systems incorporating the data storage apparatus.

While the present invention has been particularly shown and described with reference to exemplary embodiments thereof, it will be understood by those of ordinary skill in the art that various changes in forms and details may be made therein without departing from the scope of the invention as defined by the following claims.

What is claimed is:

1. A method of forming a servo track on a recording medium of a data storage apparatus, the method comprising:
   forming a magnetic layer on a first side of the recording medium;
   defining a first servo track region having a plurality of first magnetic segments and a second servo track region having a plurality of second magnetic segments in the magnetic layer;
   applying a first magnetic field to the recording medium to induce a first magnetization direction in the plurality of first magnetic segments and the plurality of second magnetic segments;
   forming first magnetic patterns, each having a first width, and second magnetic patterns, each having a second width different from the first width, on a first side of a substrate;
   disposing the first side of the substrate on the first side of the recording medium, such that the first magnetic patterns are aligned in correspondence with the plurality of first magnetic segments and the second magnetic patterns are aligned in correspondence with the plurality of second magnetic segments;
   applying a second magnetic field to the recording medium to selectively induce a second magnetization direction into first selected ones of the plurality of first magnetic segments and second selected ones of the plurality of second magnetic segments.

2. The method of claim 1, wherein the forming the magnetic layer on the first side of the recording medium comprises applying a magnetic material of predetermined thickness to one side of a disk.

3. The method of claim 1, wherein each one of the plurality of first magnetic segments has a first width and each one of the plurality of second magnetic segments has the second width.

4. The method of claim 3, wherein the first width is 1/N of the second width, where N is an integer greater than 0.

5. The method of claim 1, further comprising:
   recording servo data in the second servo track region.

6. The method of claim 5, wherein the first servo track region comprises dual servo track regions bracketing the second servo track region and each one of the dual servo track regions is a buffer region.

7. The method of claim 1, wherein the first and second magnetic patterns are formed from a material communicating the second applied magnetic field to the magnetic layer of the recording medium, and adjacent ones of the first and second magnetic patterns are separated by gaps.

8. The method of claim 1, wherein the first magnetic field is applied through a second side of the recording medium opposite the first side and in a direction perpendicular to a principal plane of the magnetic layer.

9. The method of claim 8, wherein the second magnetic field is applied through a second side of the substrate opposite the first side and in a direction perpendicular to a principal plane of the magnetic layer.

10. The method of claim 9, wherein the first and second magnetization directions are opposite one to another.

11. A method of reading servo data from a servo track formed on a recording medium of a data storage apparatus, the method comprising:
   detecting a first read signal having a first frequency from a first servo track region, and detecting a second read signal having a second frequency different from the first frequency from a second servo track region; and
   filtering the first read signal from the second read signal in relation to the different first and second frequencies,
   wherein the first and second frequencies of the first and second read signals are defined by
   forming an arrangement of first magnetic segments having a first width in the first servo track region and an arrangement of second magnetic segments having a second width different from the first width in the second servo track region, and
   inducing first and second magnetization directions in selected one of the first magnetic segments and the second magnetic segments.

12. The method of claim 11, wherein the first width is 1/N of the second width, where N is an integer greater than 0.

13. The method of claim 11, wherein servo data is recorded in the second servo track region.

14. The method of claim 11, wherein filtering the first read signal from the second read signal comprises removing the first read signal.

15. A data storage apparatus comprising:
a data storage unit comprising recording medium having a magnetic layer formed thereon, the magnetic layer comprising; a first servo track region having an arrangement of first magnetic segments, and a second servo track region having an arrangement of second magnetic segments;
a read head configured to detect a first read signal from the first servo track region and a second read signal from the second servo track region;
a filter configured to filter the first and second read signals; and
a controller configured to control overall operation of the data storage unit, and the read head,
wherein first and second frequencies respectively associated with the first and second read signals are defined by,
forming the arrangement of first magnetic segments with a first width in the first servo track region and the arrangement of second magnetic segments with a second width different from the first width in the second servo track region, and
inducing first and second magnetization directions in a respective selected one of the first magnetic segments and the second magnetic segments.

16. The apparatus of claim 15, wherein the first width is $1/N$ of the second width, where N is an integer greater than 0.

17. The apparatus of claim 15, wherein servo data is recorded in the second servo track region.

18. The apparatus of claim 15, wherein the filter removes the first read signal from the second read signal.

19. A data storage system comprising:
a data storage apparatus configured to store write data and provide read data via a bus;
a central processing unit configured to control operation of the data storage apparatus; and
an interface configured to receive externally provided write data and transmit the write data to the data storage apparatus, and further configured to transmit read data retrieved from the data storage apparatus,
wherein the data storage apparatus comprises:
a data storage unit comprising recording medium having a magnetic layer formed thereon, the magnetic layer comprising; a first servo track region having an arrangement of first magnetic segments, and a second servo track region having an arrangement of second magnetic segments;
a read head configured to detect a first read signal from the first servo track region and a second read signal from the second servo track region;
a filter configured to filter the first and second read signals; and
a controller configured to control overall operation of the data storage unit, and the read head,
wherein first and second frequencies respectively associated with the first and second read signals are defined by,
forming the arrangement of first magnetic segments with a first width in the first servo track region and the arrangement of second magnetic segments with a second width different from the first width in the second servo track region, and
inducing first and second magnetization directions in a respective selected one of the first magnetic segments and the second magnetic segments.

* * * * *